(12) United States Patent
Addink

(10) Patent No.: US 7,631,945 B2
(45) Date of Patent: Dec. 15, 2009

(54) BICYCLE WHEEL WITH OVER-SIZED SPOKES

(75) Inventor: Brad J. Addink, Sun Prairie, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 11/846,115

(22) Filed: Aug. 28, 2007

(65) Prior Publication Data

US 2009/0058179 A1    Mar. 5, 2009

(51) Int. Cl.
B60B 1/04    (2006.01)
(52) U.S. Cl. .......................................... 301/59; 301/104
(58) Field of Classification Search .................... 301/55, 301/56, 58, 59, 61, 74, 75, 80, 104, 110.5
See application file for complete search history.

(56) References Cited

U.S. PATENT DOCUMENTS

| | | | |
|---|---|---|---|
| 705,567 | A | 7/1902 | Edwards |
| 910,001 | A | 1/1909 | Jenkinson |
| 1,059,098 | A | 4/1913 | Zarth |
| 1,479,694 | A | 1/1924 | Bleado |
| 5,110,190 | A | 5/1992 | Johnson |
| 5,332,295 | A | 7/1994 | Vogel et al. |
| 5,429,421 | A | 7/1995 | Watson |
| 5,445,439 | A | 8/1995 | Dietrich |
| 5,489,147 | A | 2/1996 | Borsai |
| 5,494,337 | A | 2/1996 | Behnke |
| 5,626,401 | A | 5/1997 | Terry, Sr. et al. |
| 5,795,036 | A | 8/1998 | Campagnolo |
| 5,931,544 | A | 8/1999 | Dietrich |
| 5,938,293 | A | 8/1999 | Dietrich |
| 6,036,279 | A | 3/2000 | Campagnolo |
| 6,126,243 | A | 10/2000 | Oakajima et al. |
| 6,189,978 | B1 * | 2/2001 | Lacombe et al. ............ 301/104 |
| 6,196,638 | B1 | 3/2001 | Mizuno et al. |
| 6,213,562 | B1 | 4/2001 | Muraoka et al. |
| 6,234,580 | B1 | 5/2001 | Muraoka et al. |
| 6,244,667 | B1 | 6/2001 | Dietrich |
| 6,364,423 | B1 | 4/2002 | Chen |
| 6,367,883 | B1 | 4/2002 | Chen |
| 6,375,273 | B2 * | 4/2002 | Pont ............................ 301/59 |
| 6,378,953 | B2 | 4/2002 | Mercat et al. |
| 6,428,113 | B2 | 8/2002 | Dietrich |
| 6,431,658 | B1 | 8/2002 | Nakajima et al. |
| 6,497,042 | B1 | 12/2002 | Dietrich |

(Continued)

FOREIGN PATENT DOCUMENTS

EP    1369264    5/2004

(Continued)

Primary Examiner—S. Joseph Morano
Assistant Examiner—Kip T Kotter
(74) Attorney, Agent, or Firm—Boyle Fredrickson, S.C.

(57) ABSTRACT

A bicycle wheel having a number of larger than normal spokes constructed to support a rim about a hub. The hub includes a number of recesses that are constructed to receive an end of each spoke. The spoke and hub are constructed such that translation of the spoke in an axial direction relative to the hub engages an end of each spoke with a respective recess. Each spoke can be rotated about an axis of the spoke when the spoke is positioned in a respective recess such that the rim is generally concentrically supported about the hub by a limited number of spokes.

20 Claims, 3 Drawing Sheets

U.S. PATENT DOCUMENTS

| | | |
|---|---|---|
| D472,197 S | 3/2003 | Clark |
| 6,557,946 B1 | 5/2003 | Gerrit et al. |
| 6,715,844 B2 | 4/2004 | Dietrich |
| 6,811,228 B2 | 11/2004 | Tien |
| 6,846,047 B2 | 1/2005 | Dietrich |
| 6,886,892 B2 | 5/2005 | Chiang et al. |
| 6,899,401 B2 | 5/2005 | Schlanger |
| 6,938,962 B1 | 9/2005 | Schlanger |
| 7,070,245 B2 | 7/2006 | Tanaka |
| 7,354,114 B2 * | 4/2008 | Passarotto et al. ........... 301/104 |
| 2003/0057763 A1 | 3/2003 | Dietrich |
| 2003/0173821 A1 * | 9/2003 | Chen ........................... 301/59 |
| 2006/0006730 A1 * | 1/2006 | Meggiolan ................... 301/59 |
| 2006/0043783 A1 | 3/2006 | Passarotto et al. |
| 2007/0063574 A1 * | 3/2007 | Mercat et al. ................. 301/55 |

FOREIGN PATENT DOCUMENTS

| | | |
|---|---|---|
| EP | 1614548 A1 * | 1/2006 |
| FR | 2653069 A1 * | 4/1991 |
| JP | 11208202 A | 8/1999 |
| JP | 2002144801 A | 5/2002 |
| JP | 2006069537 A | 3/2006 |

* cited by examiner

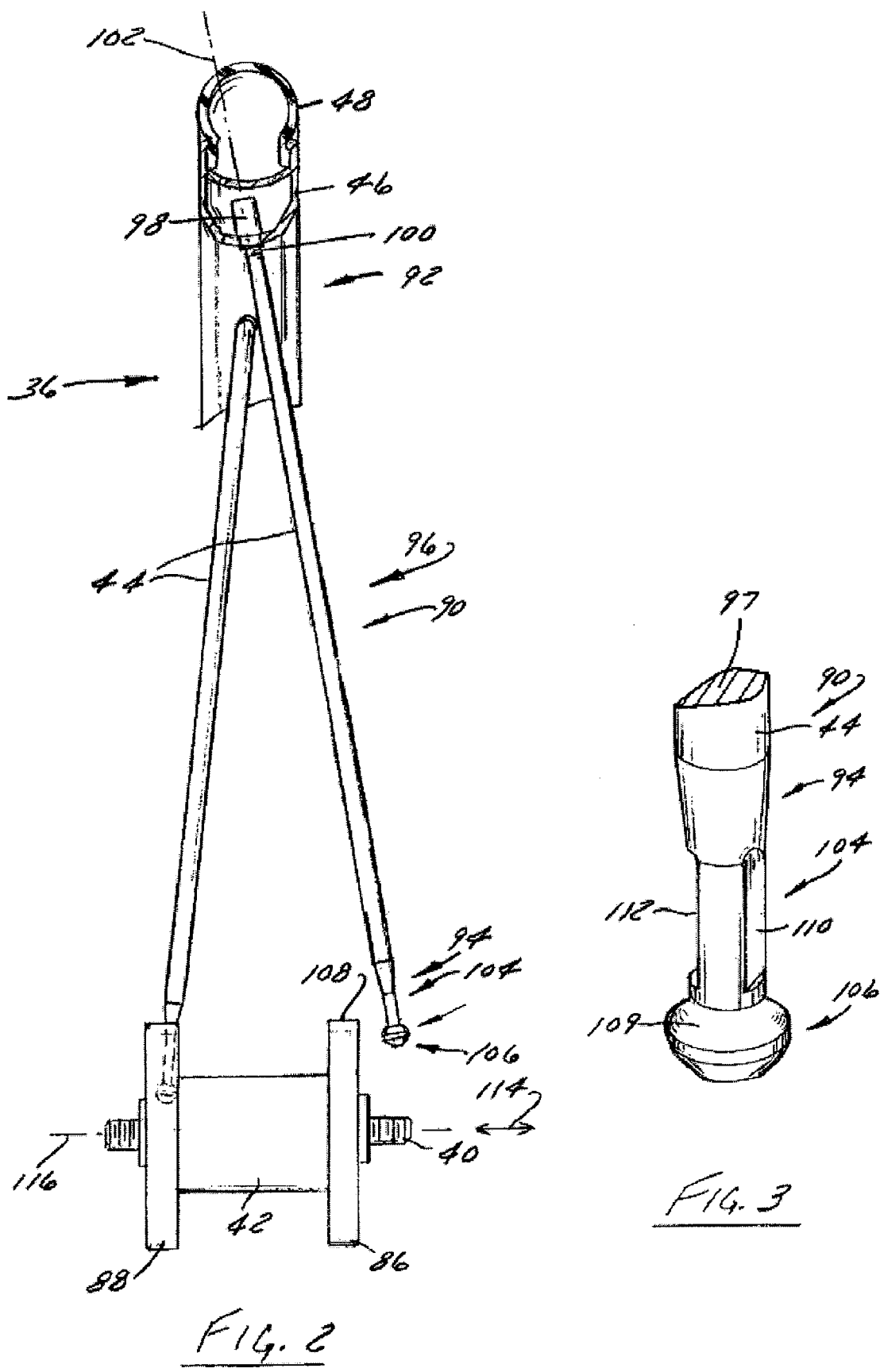

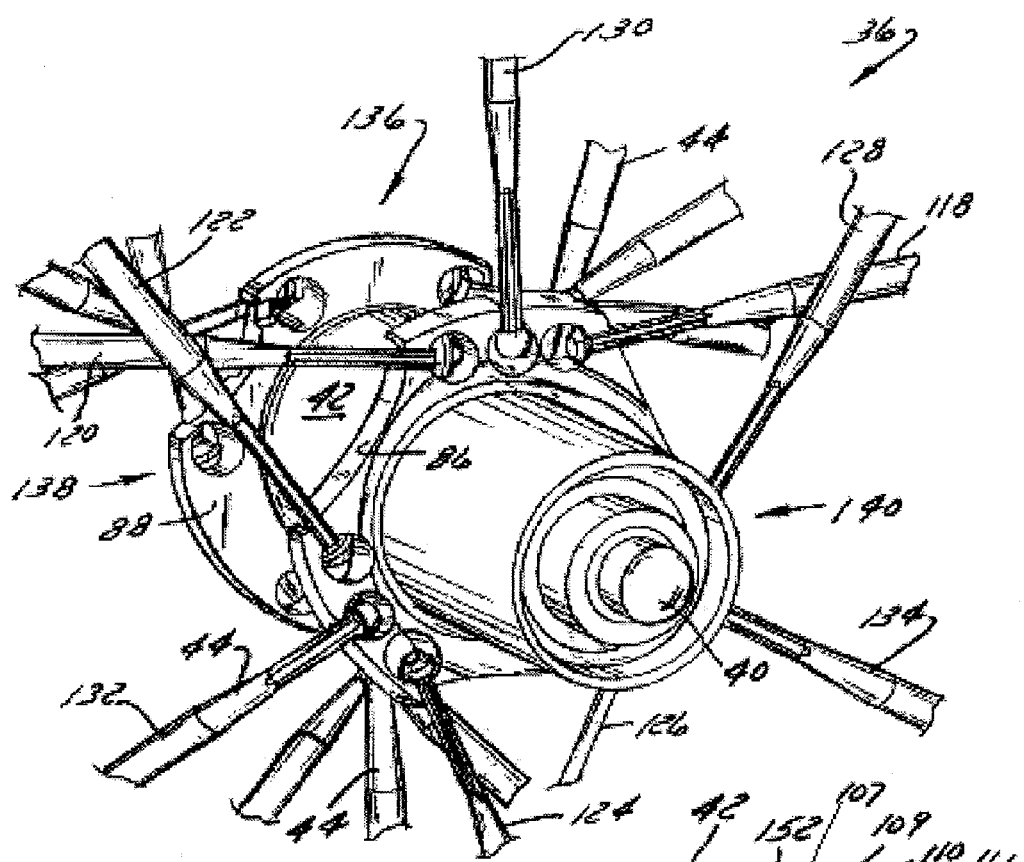
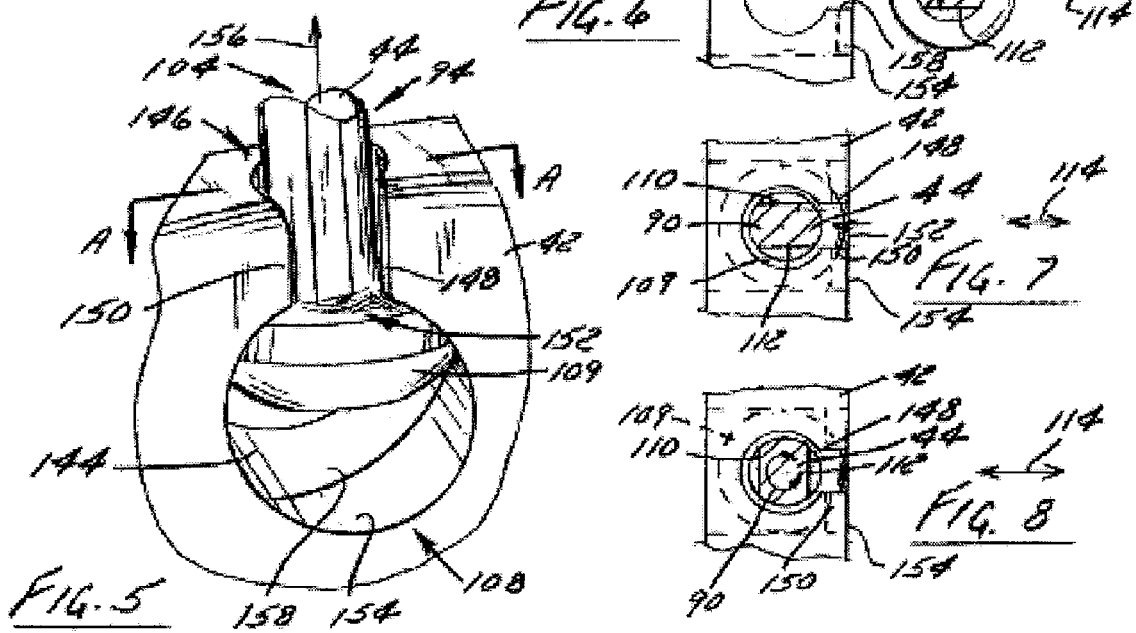

BICYCLE WHEEL WITH OVER-SIZED SPOKES

BACKGROUND OF THE INVENTION

The present invention relates generally to bicycles and, more particularly, to a bicycle spoke and wheel assembly constructed for operation with such a spoke.

A bicycle wheel generally consists of a rim oriented concentrically about a wheel hub. A number of spokes generally extend between the rim and the hub and communicate loading forces therebetween. The weight of a rider is communicated through a frame of the bicycle to the hubs of the wheels. From the hubs, the weight of the rider is communicated to the rims, and the road, by the spokes. During operation of the bicycle, the tangential loading of the tires associated with the tires engagement with a ground surface, is communicated to the frame via the spoked connection between the rim and the hub.

The number, construction, and orientation of the spokes directly relates to the performance and strength of the resultant wheel. A normal bicycle wheel generally includes 32 to 36 spokes that extend radially between the hub and the rim. Typically, a higher number of spokes correlates to a greater wheel strength and a fewer number of spokes correlates to a lighter wheel assembly as well as improved aerodynamic performance of the wheel. Although simply reducing the number of spokes would result in a lighter wheel assembly, a wheel having a lower than normal spoke count must still be constructed to support the loads associated with operation of the bicycle. Failure to do so would result in premature, if not total failure, of the wheel during operation.

Although others have provided wheel assemblies having lower than normal spoke counts, these systems are not without their drawbacks. In addition to the weight and aerodynamic considerations discussed above, providing fewer total spokes and increasing the size of the fewer spokes, also effects the efficient operation of the bicycle. As generally understood, more force is required to accelerate a unit of mass located on a wheel than on a frame. That is, because the wheel must rotate as well as translate during operation of the bicycle, energy of the rider must be utilized to accelerate and decelerate the wheel. Accordingly, providing a reduced spoke count wheel assembly that includes additional securing systems or components to secure each of the fewer spokes to the hub and rim detrimentally affects rider efficiency. Furthermore, such features further complicate the construction and/or assembly of the respective wheels.

Accordingly, it would be desirable to provide a spoke, bicycle wheel assembly, and method of providing a bicycle wheel that is robust, enhances the aerodynamic performance of the wheel assembly, and does not detrimentally affect rider efficiency or manufacturing processes or assembly.

BRIEF DESCRIPTION OF THE INVENTION

The present invention provides a system and method of forming a bicycle wheel that overcomes the aforementioned drawbacks. One aspect of the invention includes a spoke that is constructed to be secured to a hub without additional securing systems. A hub end of the spoke includes a contour that allows the spoke to be axially engaged with a hub, radially translate relative to the hub, and axially secures the spoke to the hub. Such a construction provides a spoke that can be simply and efficiently connected to a hub as well secured thereto without additional securing means thereby limiting the weight associated with a wheel assembly.

A bicycle wheel assembly according to another aspect of the invention includes a number of larger than normal spokes that are constructed to support a rim about a hub. The hub includes a number of recesses that are constructed to receive an end of each spoke. The spoke and hub are constructed such that translation of the spoke in an axial direction relative to the hub engages an end of each spoke with a respective recess. Each spoke can be rotated about an axis of the spoke when the spoke is positioned in a respective recess such that the rim is generally concentrically supported about the hub by a limited number of spokes. Such a construction provides a wheel assembly having desired aerodynamic performance.

Another aspect of the invention discloses a bicycle wheel spoke having a body with a first end for engaging a hub and a second end for engaging a rim. A projection is formed proximate the first end and is constructed to resist radial translation of the body relative to the hub. A land is formed on a portion of the body proximate the projection and is constructed to allow the body to rotate relative to the hub. Such a construction allows the spoke to be quickly and conveniently connected to the hub and rim.

A bicycle wheel assembly according to a further aspect of the invention discloses a rim, a hub having a tab, and a spoke. The tab extends over a portion of a channel formed in the hub. The spoke extends between the hub and the rim and has a contour proximate the hub that is constructed to allow the spoke to pass axially into the channel. The contour of the spoke engages the tab so that, upon rotation of the spoke relative to the hub, the contour and the tab cooperate to axially secure the spoke relative to the hub.

Yet another aspect of the invention discloses a method of forming a bicycle wheel. The method includes the steps of providing a rim having a number of nipples and providing a hub having a number of grooves. A first end of a spoke is engaged with one of the nipples and a second end of the spoke is engaged with the hub. The second end of the spoke is engaged with the hub by translating the spoke axially relative to the groove and rotating the spoke relative to the groove.

These and various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 2 is a partial cross-sectional view of a radial portion of one of the wheel assemblies shown in FIG. 1.

FIG. 3 is a perspective view of a hub end of a spoke of the wheel assemblies shown in FIG. 1.

FIG. 4 is a perspective view of a hub portion of one of the wheel assemblies shown in FIG. 1.

FIG. 5 is a perspective view of an individual spoke engaged with the hub of the wheel assembly shown in FIG. 2.

FIGS. 6-8 are cross-sectional views of the engagement of the spoke with the hub along line A-A shown in FIG. 5.

DETAILED DESCRIPTION OF THE PREFERRED EMBODIMENT

Figure 1:
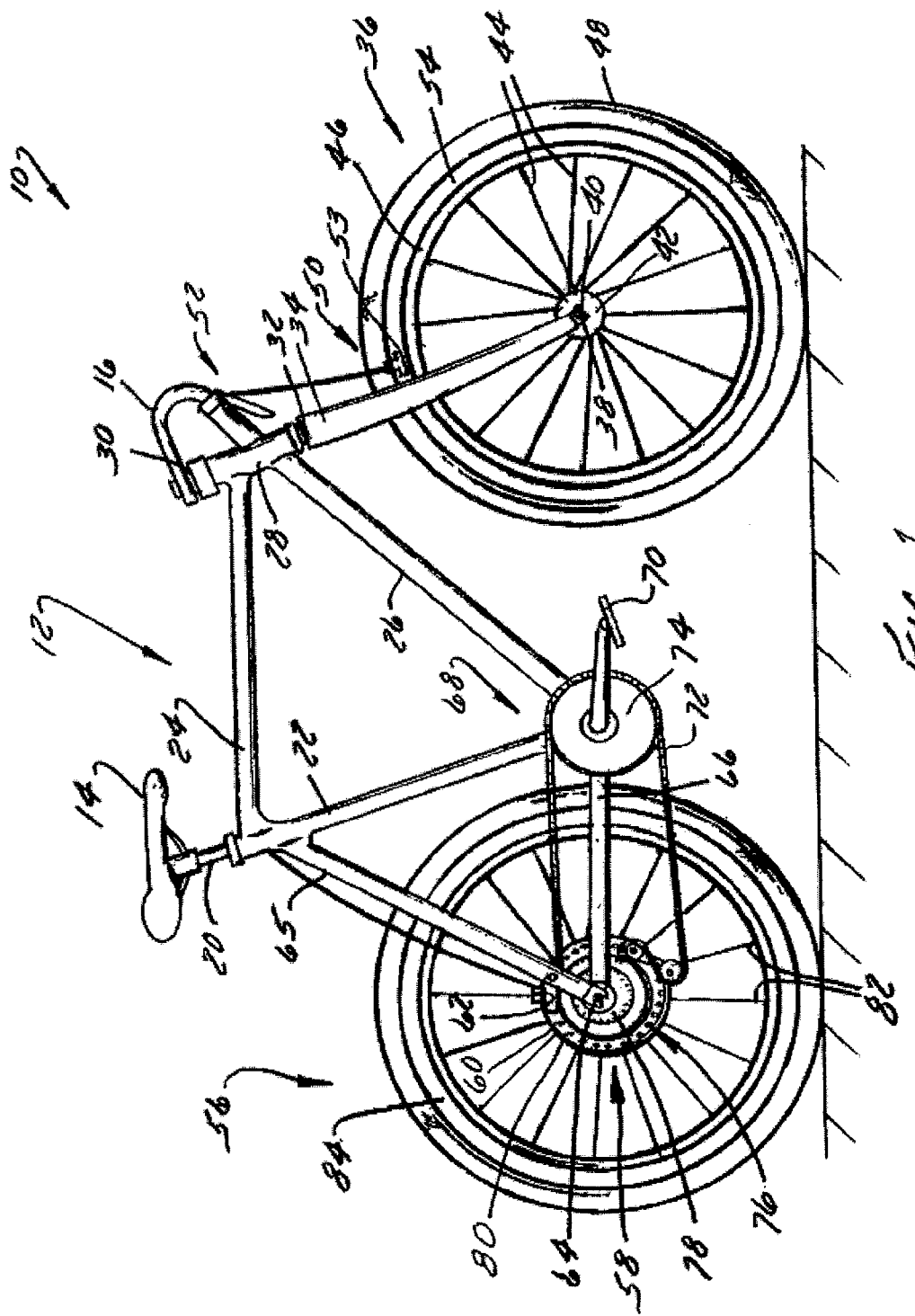
FIG. 1 is an elevational view of the bicycle equipped with a pair of wheel assemblies according to the present invention.

FIG. 1 shows a bicycle 10 having a frame 12 supported by wheel assemblies constructed according to the present invention. Bicycle 10 includes a seat 14 and handlebars 16 that are attached to frame 12. A seat post 20 is connected to seat 14 and slidably engages a seat tube 22 of frame 12. A top tube 24 and a down tube 26 extend forwardly from seat tube 22 to a head tube 28 of frame 12. Handlebars 16 are connected to a stem 30 that passes through head tube 28 and engages a fork crown 32. A pair of forks 34 extend from generally opposite ends of fork crown 32 and are constructed to support a front wheel assembly 36 at an end thereof or fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

Bicycle 10 includes a front brake assembly 50 having an actuator 52 attached to handlebars 16 and a pair of brake pads 53 positioned on generally opposite sides of front wheel assembly 36. Brake pads 53 are constructed to engage a brake wall 54 of rim 46 thereby providing a stopping or slowing force to front wheel assembly 36. Comparatively, a disc brake assembly 58 having a rotor 60 and a caliper 62 are positioned proximate a rear axle 64 associated with a rear wheel assembly 56. Understandably, one or both of front wheel assembly 36 and rear wheel assembly 56 could be equipped with rim based or disc based braking systems. Rear wheel assembly 56 is positioned generally concentrically about a rear axle 64 such that rear wheel assembly 56 rotates about rear axle 64.

A seat stay 65 and a chain stay 66 offset rear axle 64 from a crankset 68. Crankset 68 includes a pedal 70 that is operationally connected to a chain 72 via a chain ring or sprocket 74. Rotation of chain 72 communicates a drive force to a rear section 76 of bicycle 10 having a gear cluster 78 positioned thereat. Gear cluster 78 is generally concentrically orientated with respect to rear axle 64 and includes a number of variable diameter gears.

Gear cluster 78 is operationally connected to a hub 80 of rear wheel assembly 56. Rear wheel assembly 56 includes hub 80, a number of spokes 82, and a rim 84. Each of the number of spokes 82 extend between hub 80 and rim 84 and communicate the loading forces therebetween. As is commonly understood, rider operation of pedals 70 drives chain 72 thereby driving rear wheel assembly 56 which in turn propels bicycle 10. Front wheel assembly 36 and rear wheel assembly 56 are constructed such that spokes 44, 82 communicate the forces associated with the loading and operation of bicycle 10 between hubs 42, 80 and rims 46, 84, respectively. The description set forth herein below further describes the construction of front wheel assembly 36. It is appreciated that rear wheel assembly 56 could be constructed in a similar fashion. It should be readily apparent that bicycle 10 is shown as what is commonly understood as a road bike, or a bicycle configured for operation on paved terrain. It is appreciated that bicycle 10 could form an off-road or mountain bike and that such bicycles may equally benefit from the present invention.

FIG. 2 shows a partial cross-section of front wheel assembly 36 removed from bicycle 10. Axle 40 extends beyond generally opposite spoke walls 86, 88 of hub 42 and is constructed to attach hub 42 to bicycle 10. Each spoke 44 includes a generally elongated body 90 that extends between a first end 92 and a second end 94 of the spoke 44. Elongated body 90 includes a center portion 96 that can have a variety of cross-sectional shapes. Center portion 96 may have a cross-sectional shape that is any of generally circular, relatively flat, wing shaped, foil shaped, airfoil shaped, or any combination thereof. Preferably, as shown in FIG. 3, at least a portion of center portion 96 of at least one spoke 44 has a contour or cross section 97 that is foil, airfoil, wing, or fin shaped.

Preferably, body 90 is also formed of a metal material such as aluminum, titanium, or alloys thereof. Understandably, spokes 44 could be constructed to any suitable material such as other metals, alloys, or carbon fiber based materials.

First end 92 of spoke 44 is constructed to engage a nipple 98 that is engaged with rim 46. First end 92 includes a threaded portion 100 that is constructed to pass into and engage nipple 98. Such a construction allows radial translation of spoke 44 relative to hub 42 upon rotation of spoke 44 about an axis, indicated by line 102, of body 90. Second end 94 of spoke 44 includes a contour 104 and a projection 106 formed thereat. Contour 104 and projection 106 are constructed to allow second end 94 of spoke 44 to operatively engage a groove, recess or channel 108 formed in either of spoke walls 86, 88 thereby securing spoke 44 to hub 42. Body 90 has a generally linear construction from first end 92 to second end 94 as compared with many known spoke constructions which generally include a bent portion proximate one of the ends of the body of the spoke.

Referring to FIG. 3, projection 106 forms a bulb 109 at second end 94 of spoke 44. Contour 104 includes a pair of generally opposite facing lands 110, 112 configured to allow axial translation of spoke 44 relative to hub 42. Referring back to FIG. 2, axial translation of spoke 44 is defined as translation of spoke 44 in a direction, indicated by arrows 114, generally aligned with an axis 116 of hub 42. As described further below, radial translation of spokes 44 is generally understood as translation of the spoke in a crossing direction relative to hub 42. As shown in FIG. 4, spokes 44 extend radially from hub 42 in a number of radial directions. A number of spokes 118, 120, 122, 124, 126, 128 extend radially in directions that are substantially tangential relative to axle 40. Such an orientation allows efficient communication of the torque forces between hub 42 and rim 46. Comparatively, a number of other spokes 130, 132, 134 extend radially and are more generally aligned along the lines of radius of wheel assembly 36.

Spokes 130, 132, 134 generally extend from spoke wall 86 to rim 46 in a non-crossing orientation. Comparatively, a number of spokes extend between hub 42 and rim 46 in a crossing orientation. For example, spokes 118 and 128 cross one another as they extend across the space between rim 46 and hub 42. Each spoke wall 86, 88 includes a number of lobes 136, 138, 140 positioned circumferentially about the respective spoke wall 86, 88. A number of spokes 44 are secured to hub 42 proximate each respective lobe 136, 138, 140. The crossing and non-crossing orientations of spokes 44 allow spokes 44 to be secured to hub 42 and generally uniformly spaced about a circumference of rim 46. Such a construction ensures that each of spokes 44 supports a comparable portion of the loading of bicycle 10. Preferably, wheel assembly 36 includes eighteen spokes 44 such that each spoke 44 supports 1/18th of the loading of rim 46 and hub 42. Understandably, other wheel assemblies having more than or less than eighteen spokes are envisioned and within the scope of the appending claims.

FIGS. 5-8 show the engagement of a single spoke 44 with hub 42. Each channel 108 includes a first portion 144 that is constructed to slidably receive a respective bulb 109. A second portion 146 of each channel 108 is constructed to slidably receive contour 104 of the respective spoke 44. A pair of tabs 148, 150 extends in generally crossing directions relative to second portion 146 of channel 108. A passage 152 is formed between tabs 148 and cooperates with contour 104 to allow selective engagement of spoke 44 with channel 108. An optional lip 154 is formed about first portion 144 of channel 108 such that, as spoke 44 translates toward rim 46, indicated by arrow 156, bulb 109 and contour 104 each prevent axial translation of spoke 44 relative to hub 42.

Referring to FIGS. 6-7, spoke 44 is operatively engaged with channel 108 when lands 110, 112 are generally aligned with passage 152 formed in hub 42. As shown in FIG. 6, contour 104 (FIG. 3) of each spoke 44 includes a first width 107 that is less than a second width 111 that is in a common plane therewith. First width 107 extends in a direction that is generally transverse to the orientation of lands 110, 112 whereas second width 111 is generally parallel to the orientation of lands 110, 112 and is transverse to first width 107. Said in another way, second width 111 is generally aligned with direction 114. As shown in FIG. 7, passage 152 and lands 110, 112 are constructed to allow second end 94 of spoke 44 to move in direction 114 relative to hub 42. As shown in FIG. 8, once contour 104 passes tabs 148, 150, spoke 44 is free to rotate about axis 102 of body 90, as shown in FIG. 2. First end 92 of each spoke 44 is threadably engaged with a respective nipple 98 of rim 46 during rotation of body 90. Alternatively, with second end 94 of spoke 44 oriented such that one of lands 110, 112 generally faces passage 152, spoke 44 is restrained from axial movement relative to hub 42 and the nipple can be rotated to facilitate tensioning of the spoke.

As shown in FIG. 8, bulb 109 limits the radial translation of spoke 44. That is, because bulb 109 is larger than second portion 146 of channel 108, hub 42 resists radial translation of spoke 44 relative to hub 42 when bulb 109 is engaged with a surface 158 of channel 108. Such a construction provides an oversized area for translating forces between spoke 44 and hub 42. Additionally, with no more than the interfering geometries of hub 42 and spoke 44 forming the secured connection therebetween, wheel assembly 36 is convenient to manufacture, easy to assemble, and simple to repair. Furthermore, supporting rim 46 about hub 42 with a number of over-sized spokes 44 provides a robust wheel assembly with desired aerodynamic performance.

A bicycle wheel spoke according to one embodiment of the invention includes a body having a first end for engaging a hub and a second end for engaging a rim. A projection is formed proximate the first end and is constructed to resist radial translation of the body relative to the hub. A land is formed on a portion of the body proximate the projection and is constructed to allow the body to rotate relative to the hub.

Another embodiment of the invention includes a bicycle wheel assembly that has a rim, a hub having a tab, and a spoke. The tab extends over a portion of a channel formed in the hub. The spoke extends between the hub and the rim and has a contour proximate the hub that is constructed to allow the spoke to pass axially into the channel proximate the tub. The contour of the spoke engages the tab so that, upon rotation of the spoke relative to the hub, the contour and the tab cooperate to axially secure the spoke relative to the hub.

A method of forming a wheel according to another embodiment of the invention includes the steps of providing a rim having a number of nipples, providing a hub having a number of grooves, engaging a first end of a spoke with a nipple, and engaging a second end of the spoke with the hub. The second end of the spoke is engaged with the hub by translating the spoke axially relative to the groove and rotating the spoke relative to the groove.

The present invention has been described in terms of the preferred embodiment, and it is recognized that equivalents, alternatives, and modifications, aside from those expressly stated, are possible and within the scope of the appending claims.

What is claimed is:

1. A bicycle wheel spoke comprising:
    a body having a first end for engaging a hub and a second end for engaging a rim;
    a projection formed proximate the first end for resisting radial translation of the body relative to the hub; and
    a pair of lands formed on a portion of the body proximate the projection and constructed for allowing the body to rotate relative to the hub to allow operative engagement of the body with a respective nipple by rotation of the body relative to the hub, the lands being spaced apart by a first width that is less than a second width that is oriented in a crossing direction relative to the first width, both the first width and the second width allowing rotation of the body about a longitudinal axis of the body relative to the hub even when the projection is seated for use relative to the hub and, the first width allows axial translation of the body and the second width prevents axial translation of the body, relative to the hub.

2. The spoke of claim 1 wherein the body includes a center portion having a generally elongated cross-section.

3. The spoke of claim 2 wherein the elongated cross-section is airfoil shaped.

4. The spoke of claim 1 wherein the spoke is constructed to support no less than about $\frac{1}{18}$th of a load of the rim.

5. The spoke of claim 1 wherein the second end is threaded for engaging the respective nipple that is constructed to engage the rim.

6. The spoke of claim 1 wherein the body is formed of aluminum or titanium.

7. The spoke of claim 1 wherein the body has a generally linear axis that extends from the first end to the second end.

8. A bicycle wheel assembly comprising:
    a rim;
    a hub having a channel formed therein;
    a tab extending over a portion of the channel;
    a spoke extending between the hub and the rim and having a generally round bulb shaped projection and a contour proximate the hub, the spoke having a longitudinal axis that remains substantially aligned with a longitudinal axis of a respective channel when the spoke is introduced to the respective channel and when the spoke is secured between the hub and the rim; and
    the contour constructed to allow the spoke to pass axially into the channel and engage the tab to axially secure the spoke relative to the hub upon rotation of the spoke relative to the hub, wherein interaction between the contour and the hub does not interfere with the ability of the spoke to rotate about the longitudinal axis when the projection is operationally secured to the hub.

9. The assembly of claim 8 further comprising a plurality of spokes and a corresponding plurality of channels wherein a number of spokes extend in crossing directions between the hub and the rim.

10. The assembly of claim 9 wherein each spoke of the plurality of spokes is configured to support about $\frac{1}{18}$th of a load of the rim.

11. The assembly of claim 8 wherein the bulb shaped projection is formed at a distal end of the spoke and a land formed inward of the bulb shaped projection.

12. The assembly of claim 11 wherein the channel includes a first portion constructed to receive the bulb shaped projection in a manner that does not interfere with rotation of the spoke relative to the hub and a second portion constructed to face the land, the second portion having a generally circular shape.

13. The assembly of claim 8 wherein the spoke further comprises a fin shaped contour between the hub and the rim.

14. The assembly of claim 8 further comprising a plurality of channels oriented in groups distributed about a circumference of the hub.

15. A method of forming a bicycle wheel comprising the steps of:
   a) providing a rim having a number of nipples;
   b) providing a hub having a number of grooves;
   c) engaging a first end of a spoke with a nipple; and
   d) engaging a second end of the spoke with the hub by translating the spoke axially relative to the groove by passing a pair of lands through a passage between a pair of tabs positioned to flank a respective groove so that a longitudinal axis of each of the spoke, the groove, and the nipple are aligned and the second end of each spoke cooperates with a respective groove to selectively interfere with only axial translation of the second end of the spoke relative to the hub and while allowing rotation of the spoke about the longitudinal axis of the spoke relative to the groove to alter the distance between the nipple and the hub to seat the second end of the spoke relative to the hub in a manner that does not interfere with the ability to rotate the spoke relative to the hub.

16. The method of claim 15 further comprising constructing the spoke of a metal material.

17. The method of claim 16 further comprising forming the spoke of aluminum or titanium.

18. The method of claim 15 wherein rotating the spoke forms an interference engagement between the spoke and a tab constructed to extend from the hub over a portion of the groove.

19. The method of claim 15 further comprising forming a foil shape over a portion of the spoke.

20. The method of claim 15 further comprising repeating steps c and d no more than twenty times for a given wheel.

\* \* \* \* \*